US010800545B2

(12) United States Patent
McDonnell (10) Patent No.: US 10,800,545 B2
(45) Date of Patent: Oct. 13, 2020

(54) ROCKET LANDING SYSTEM (71) Applicant: Advanced Aerospace Technologies, Inc., St. Louis, MO (US)

(72) Inventor: William Randall McDonnell, St. Louis, MO (US)

(73) Assignee: Advanced Product Development, LLC, Las Vegas, NV (US)

( * ) Notice: Subject to any disclaimer, the term of this patent is extended or adjusted under 35 U.S.C. 154(b) by 503 days.

(21) Appl. No.: 15/552,467

(22) PCT Filed: Feb. 22, 2016

(86) PCT No.: PCT/US2016/018901
§ 371 (c)(1),
(2) Date: Aug. 21, 2017

(87) PCT Pub. No.: WO2016/137877
PCT Pub. Date: Sep. 1, 2016

(65) Prior Publication Data
US 2018/0044035 A1    Feb. 15, 2018

Related U.S. Application Data

(60) Provisional application No. 62/147,085, filed on Apr. 14, 2015, provisional application No. 62/130,917, (Continued)

(51) Int. Cl.
*B64F 1/02*    (2006.01)
*B63B 17/00*   (2006.01)
(Continued)

(52) U.S. Cl.
CPC .............. *B64F 1/02* (2013.01); *B63B 1/121* (2013.01); *B63B 17/00* (2013.01); *B63B 35/52* (2013.01);
(Continued)

(58) Field of Classification Search
CPC . B64G 1/002; B64G 1/62; B64G 5/00; B64G 2005/005; B64F 1/02; B64C 2201/182
See application file for complete search history.

(56) References Cited

U.S. PATENT DOCUMENTS 5,620,152 A * 4/1997 Sargent ................. F42B 10/666
                                             244/3.12
5,667,167 A * 9/1997 Kistler ................... B64G 1/002
                                             244/110 E
(Continued)

FOREIGN PATENT DOCUMENTS

| JP | 04-201700 A | 7/1992 |
| JP | H0811800 A | 1/1996 |
| JP | 2014-141234 A | 8/2014 |

OTHER PUBLICATIONS

International Search Report for PCT application PCT/US2016/018901 dated Jun. 14, 2016.
Written Opinion of the International Search Authority for PCT application PCT/US2016/018901 dated Jun. 14, 2016.

*Primary Examiner* — Philip J Bonzell
*Assistant Examiner* — Michael B Kreiner
(74) *Attorney, Agent, or Firm* — Sandberg Phoenix & von Gontard, P.C.

(57) ABSTRACT

A generally vertical rocket (2) flies generally horizontally into recovery line, cable or chain (3) suspended between towers (5, 7) of a catamaran landing ship (9). High speed winches (11, 13), preferably located near or at the tops of the towers (5, 7) can rapidly reel in or out the recovery line (3) to effectively raise or lower the recovery line (3). The fixture engages a capture device on the rocket located usually above the rocket center of gravity. This invention provides a more reliable means of landing a rocket and also eliminates rocket weight, cost and complexity associated with previous means of landing a rocket.

26 Claims, 12 Drawing Sheets

Related U.S. Application Data filed on Mar. 10, 2015, provisional application No. 62/126,174, filed on Feb. 27, 2015, provisional application No. 62/119,519, filed on Feb. 23, 2015.

(51) Int. Cl.
| | | |
|---|---|---|
| *B64G 5/00* | (2006.01) | |
| *B63B 1/12* | (2006.01) | |
| *B63B 35/52* | (2006.01) | |
| *B64G 1/62* | (2006.01) | |
| *B64G 1/00* | (2006.01) | |
| *B63B 35/50* | (2006.01) | |

(52) U.S. Cl.
CPC ............... *B64G 1/002* (2013.01); *B64G 1/62* (2013.01); *B64G 5/00* (2013.01); *B63B 35/50* (2013.01); *B64G 2005/005* (2013.01)

(56) References Cited

U.S. PATENT DOCUMENTS

| | | | | |
|---|---|---|---|---|
| 5,813,632 | A * | 9/1998 | Taylor | B64G 1/646 244/159.6 |
| 7,398,946 | B1 * | 7/2008 | Marshall | B60L 53/11 244/58 |
| 8,408,497 | B2 * | 4/2013 | Boelitz | B64G 1/402 244/158.9 |
| 8,418,965 | B2 * | 4/2013 | Schnitzer | B64D 1/04 244/137.4 |
| 8,424,808 | B2 * | 4/2013 | Boelitz | B64G 1/002 244/158.9 |
| 9,669,947 | B2 * | 6/2017 | Zwaan | B64C 39/024 |
| 2003/0222173 | A1 | 12/2003 | McGeer et al. | |
| 2009/0127387 | A1 | 5/2009 | Larkin | |
| 2019/0161214 | A1 * | 5/2019 | Kobayakawa | B64G 1/62 |

* cited by examiner

ROCKET LANDING SYSTEM

CROSS-REFERENCE TO RELATED APPLICATIONS

This patent application is a national stage application under 35 U.S.C. § 371 of International application No. PCT/US2016/018901, filed 22 Feb. 2016, which is related to, and claims priority from, U.S. Provisional Application No. 62/147,085, filed Apr. 14, 2015, U.S. Provisional Application No. 62/130,917, filed Mar. 10, 2015, U.S. Provisional Application No. 62/126,174, filed Feb. 27, 2015, and U.S. Provisional Application No. 62/119,519, filed Feb. 23, 2015, all the disclosures of which are hereby incorporated by reference.

FIELD OF THE INVENTION

The present invention relates to rockets designed to be recovered and reused.

BACKGROUND OF THE INVENTION

Almost from the earliest days that man envisioned going to the moon and beyond, the rockets were envisioned to take off vertically and land vertically on landing gear located below and to the sides of the rocket engines. The space shuttle used a tricycle gear for landing which was also located below the rocket engines.

SUMMARY OF THE INVENTION

The present invention envisions a rocket that lands on a flexible, generally horizontally suspended recovery fixture, line, cable or chain. The fixture engages a capture device on the rocket located usually above the rocket center of gravity. This is the first time a rocket has been envisioned with "landing gear" located above the rocket engines, or above the rocket center of gravity, when landing. This invention provides a more reliable means of landing a rocket and also eliminates rocket weight, cost and complexity associated with previous means of landing a rocket.

DETAILED DESCRIPTION OF THE PREFERRED EMBODIMENTS

Figure 1:
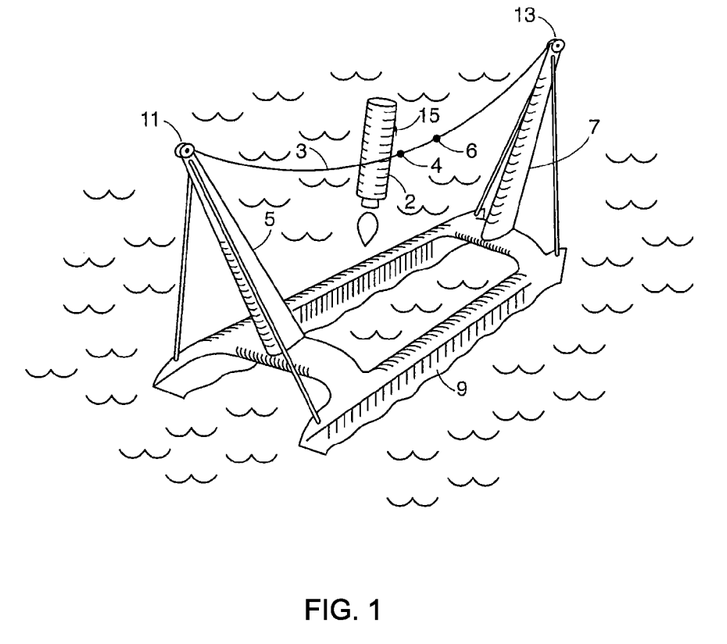
FIG. 1 is a perspective view of a rocket hooking onto a recovery line of a catamaran rocket landing ship in accordance with an embodiment of the invention.

FIG. 1 shows a rocket 2 flying generally horizontally into recovery line, cable or chain 3 suspended between towers 5 and 7 of catamaran landing ship 9. High speed winches 11 and 13, preferably located near or at the tops of the towers 5 and 7 can rapidly reel in or out the recovery line 3 to effectively raise or lower the recovery line 3.

As the rocket 2 moves sideways toward the line, the winches 11 and 13 reel in or out, and thus raises or lower, the recovery line 3 so it will contact the side of the rocket a short but safe distance below a latching hook 15 on the side of the rocket. By a safe distance I mean enough distance to assure that the line 3 won't contact the rocket above or on the hook 15. After the rocket 2 contacts the line 3, the line 3 can be rapidly raised to engage the hook 15. The preferred approach however is to start raising the line 3 as the rocket gets close to the line as shown by the path 74 in FIG. 2. In this way the momentum of the winches 11 and 13 and line 3 is moving in the right direction to continue and carry the line 3 up into the hook 15 and latch 17 for capture as soon as possible. This approach means the line should start a little lower relative to the hook 15. The intended rate for raising the line 3 should be no faster than the rate the line 3 can be raised in case one of the winches fails. In other words the system should be designed to handle the failure of one of the winches without impacting the standard mode of operation. Although a line 3 is the preferred rocket support element 3 of the recovery system, other support elements that can support the weight of the rocket such as a padded cable, chain or flexible rod could be used. Whenever the term "line" is used herein, it will be understood to encompass other support elements unless a narrower meaning is clearly indicated.

Figure 13:
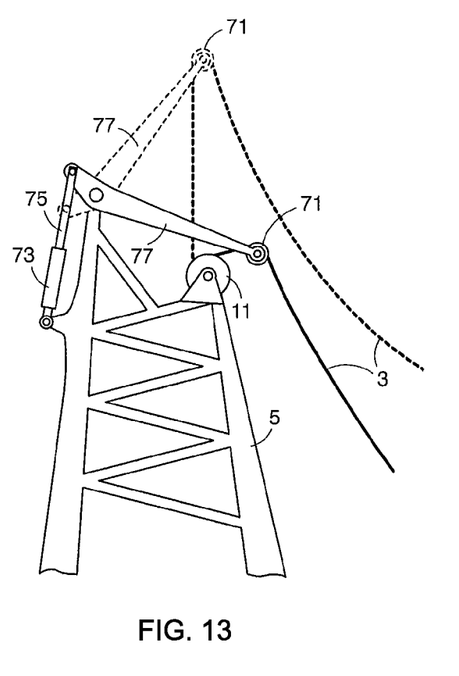
FIG. 13 shows an optional system to assist the winches in raising or lowering the recovery line.

A less desirable option for raising the line is to raise the suspension points on either end of the line or spread the suspension points away from each other to reduce the slack and thus raise the line. FIG. 13 shows such a line elevation control system. The line 3 passes out of winch 11 and over pulley 71. To raise the line 3 actuator 73 retracts piston 75 which moves lever arm 77 from the position shown in solid lines to the position shown in dashed lines. This action moves pulley 71 both up and away from the rocket, which is located between the two towers 5 and 7, and both of these actions raise the line 3. There is a natural shock absorbing capability as the line 3 straightens during the capture and stretches and as the whole recovery system flexes. The winches 11 and 13 can also be designed to reel out if the loads exceed a pre-determined value to increase the arrestment distance and reduce the peak load.

Figure 2:
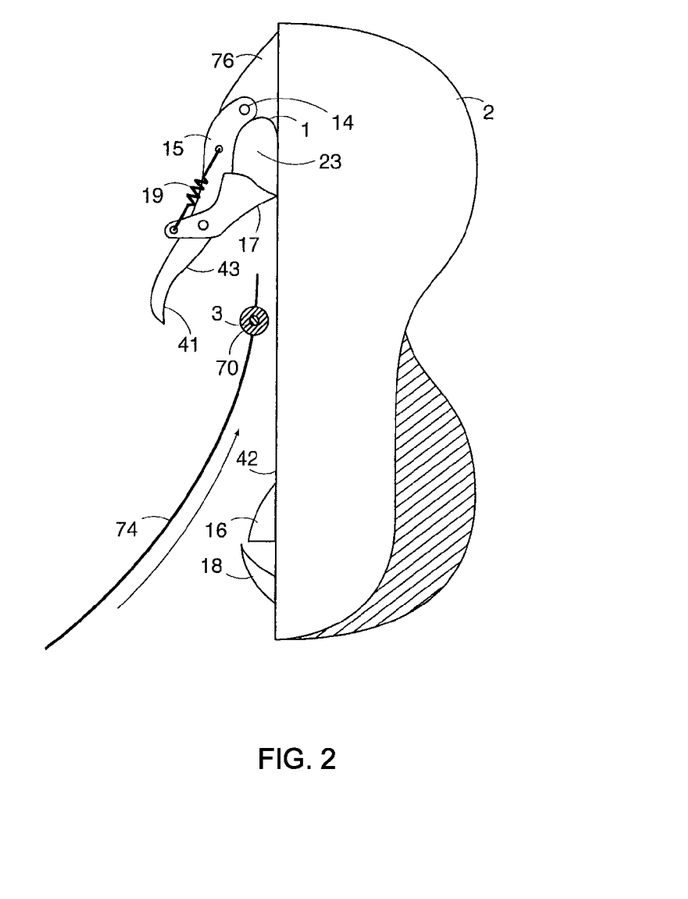
FIG. 2 shows an illustrative latching hook on the rocket to capture and retain the recovery line and a deflector to prevent the line from snagging equipment on the side of the rocket.

An illustrative hook 15 is shown in FIG. 2. Hook 15 has a latch 17 that is deflected out of the way by recovery line 3 passing into hook 15 and then snaps closed due to spring 19 to trap line 3 inside the hook 15. Line 3 is shown in cross-section with padding 70 around the line as described hereinafter. The hook 15 has a mouth that is wider than the throat 23 due to sloped region 43 in order to capture lines that aren't sliding right against the side of the rocket 42. The tip 41 of the mouth of the hook 15 curves back toward the side of the rocket 42. If the line 3 enters the mouth but hasn't been captured by the latch 17 before the line 3 rebounds away from the rocket, this tip 41 should keep the line 3 from escaping the hook 15. If both winches 11 and 13 fail to operate properly the backup approach is for the rocket 2 to lower itself to engage the line 3. If there is any object 16 (see FIG. 2) on the side of the rocket that could snag the line 3 before it engages the hook 15 then a fillet or deflector 18 would be placed under or above the object 16 to cause the line 3 to ride over the object whether it is sliding up or sliding down on the side of the rocket. As will be discussed hereinafter, elimination of such an object is preferred to prevent the line having to slide over a surface sloped away from the rocket centerline as it is traveling toward the hook. The top of the hook mounting 76 is sloped so that if the line 3 lands above the hook 15, the winches can quickly lower the line 3 over the hook 15 and then raise it again into the hook without getting snagged on the top 76 of the hook.

The preferred approach is for the catamaran to line up with the wind so there is very little rolling of the ship due to the waves. The pontoons of the catamaran would also probably be spread wider than shown in FIG. 1 to provide greater roll stability. It is desirable to have the width between the pontoons equal to or greater than the height of the towers. It is less desirable to have the towers 11 and 13 tilt or to provide other mechanisms to stabilize the left and right movement of line 3.

In heavy winds the catamaran 9 could travel downwind to reduce the relative wind for landing. The rocket could also land on the line 3 closer to the downwind tower 11 or 13 where the line 3 is sloped in a direction that can compensate for the tilting of the rocket to counteract the wind. When raising the line 3, the upwind winch might retract faster to move the line 3 forward as well as up to more easily push the latch 17 out of the way. The length of the throat 23 of the hook 15 (see FIG. 2) should be longer than the diameter of the line 3 to allow the rocket to be tilted relative to the line 3 and still be able to capture and latch on the line 3. The greater the potential tilt, the greater the length of the throat 23 required. Two hooks tilted in different directions relative to the centerline of the rocket 2 could also be used. The hook could also be designed to release the line 3 by remote control. Spring 19 could be replaced by a spring loaded solenoid that could retract the latch when desired. A hinge 14 could also be freed to rotate open by remote control so that the entire hook 15 rotates clockwise open about hinge 14 to release the line 3. This latter approach allows the line 3 to be released even if the line is being pushed into the hook 15.

The preferred approach, especially in heavy winds, is to have the recovery line 3 hanging at right angles to the pontoons and the wind, which of course means placing the towers on the left and right side of the catamaran instead of fore and aft. As such the preferred design is that of catamaran 40 shown in FIG. 5. It will be understood that a trimaran or other multi-hull ship which provides good roll stability could also be used. The rocket could approach the recovery line 3 from the upwind side or the ship would travel to the rocket from the downwind side or both. Under these conditions the rocket will be tilted a little away from the line 3 in order to counter the wind, and the line 3 will be blown back a little, both of which will help the line 3 to naturally deflect up in altitude on contact with the rocket and into the hook 15. Because the wind can be desirable, the catamaran 10 might travel into the wind close to as fast as possible so the rocket will be tilted the most away from the line 3 and this can sometimes also help to stabilize pitch, roll, and heaving of the ship. The ship can then also vary its speed to move toward or away from the rocket 2 and turn left or right to center the rocket on the line 3. Even without the rocket tilted, the line 3 naturally tends to slide up in altitude along the side of the rocket when the rocket pushes the line 3 back from its slack position since the line suspension points are higher than the center of the line 3.

Under extremely high winds, the line 3 might be blown almost horizontal. Under these conditions, if the rocket approaches the line 3 from the downwind side, then the line will tend to wrap or curl up to 180 degrees around the upwind side of the rocket which is a desirable effect since it is easier to make sure the line will engage a hook. The rocket however will then need to descend to cause the line to slide up into a hook. Although a "line" is the preferred element for the rocket to engage it will be understood that any kind of fixture such as a chain, preferably padded, or a flexible bar or the like could be used.

The line 3 also initially wraps itself a little bit around the rocket which helps in engaging the hook if the hook isn't exactly above the initial contact point of the line 3. However with enough time the line 3 will tend to rebound off the rocket and so it is important for the line to engage the hook 15 before this might happen or another attempt might be necessary. The wider the span between the two winches 11 and 13 and the lower the tension in the line 3, the longer the time it takes before the line will tend to rebound off the rocket and the weaker the rebound will be. The farther the rocket has pushed the line 3, the more pressure there is holding the line 3 against the rocket 2, and the stronger the rebound required to jump the line 3 away from the rocket 2. However the rebound tends to be stronger the farther the rocket pushes the line 3 and the faster the rocket pushes the line. As a result slowly pushing the rocket against the line 3 is preferred from the rebound standpoint, but the opposite is desired for the wrap-around effect. The hook 15 is preferably located above the rocket center of gravity on a portion of the side of the rocket that is near vertical without any objects above, and especially below, for a long distance, that could snag the line. The hook 15 is located above the rocket motors during the recovery which is a unique "landing gear" or "landing system" for a rocket.

Figure 6:
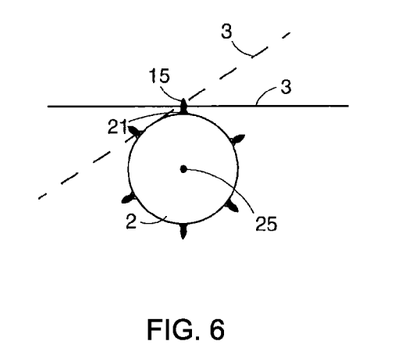
FIG. 6 shows a cross-sectional cut through the rocket and also showing the hook and recovery line relationships.

Rockets sometimes have a channel 21 running vertically down the side and extending out from the rocket such as shown in FIG. 6 which is a cross-sectional cut of a rocket. This channel 21 can house electrical or other conduits that run from near the top to near the bottom of the rocket without passing through the propellant or oxidizer tanks. If the hook 15 is placed on top of this channel 21 it puts the hook farther from the rocket centerline and makes it possible to capture the line 3 with a greater mis-alignment in rotation about the rocket centerline 25 and the line 3. The solid line 3 in FIG. 6 shows the proper alignment of the rocket 2 and the line 3. The dashed line shows the limit of mis-alignment before the line 3 might not engage the hook 15 without the benefit of wrap-around. Preferably the throat 23 of the hook 15 should be wide enough so that the line 3 doesn't bind between the two sides of the throat 23 or between one side of the throat 23 and the channel 21, as it travels into the hook at this maximum mis-alignment. The channel 21 of course must be free of anything that would snag the line 3. Binding means that one surface is trying to push the line in a contradictory direction from another surface thus increasing the friction and reducing the chance of sliding. In general as the line travels up the rocket in order to engage the hook 15 you don't want the line 3 to have to be deflected out away from the centerline of the rocket since the tension in the line 13 is generally pushing the line against the rocket 2. This could cause the line to stop sliding until the line 3 starts to rebound. The path the line takes sliding to the hook should not angle away from the centerline of the rocket. However 3° is better than 5°, which is turn is better than 8°, which in turn is better than 10°, which in turn is better than 13°, which in turn is better than 15°, which in turn is better than 20°, which in turn is better than 30°, which in turn in better than 40°, which in turn is better than 45°, which is turn is better than 50°.

Sometimes there is more solid structure on a rocket between the oxidizer and propellant tanks which makes this a potentially good location for the hook 15 to tie into rocket structure. For a side booster there is usually a strong structural connection to the center rocket near the top. The hook 15 could be incorporated into the bottom of this structure. Placing the hook where it can easily tie into already existing strong structure is beneficial.

Multiple hooks can be used spread out around the diameter of the rocket so the rocket will engage the line 13 at any rotational position. When this is done it can be beneficial to have adjacent hooks at a little bit different heights on the rocket so only one hook engages or it is desirable to make sure that binding doesn't occur between the two hooks and the side of the rocket located between the two hooks that would delay the sliding of the line 3 into the hooks. Multiple hooks can also be placed at different heights one above another to reduce the amount of sliding required to reach a hook.

Figure 7:
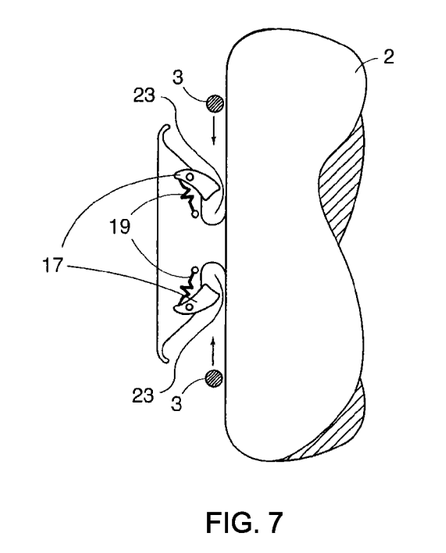
FIG. 7 shows an optional hook design that can capture lines traveling up or down the side of the rocket.

A two sided hook as shown in FIG. 7 can also be used so the line 3 can be engaged whether the line is sliding up or down along the side of the rocket 2. If it is detected that the line hit the side of the rocket above the hook, the winches 11 and/or 13 could be commanded to lower the line 13 to engage the hook. Again latches 17 deflect out of the way and are spring loaded closed. If the upper hook captures the line, this latch 17 must be strong enough to carry the weight of the rocket.

Differential GPS could be used to guide the line 3 and rocket 2 together. As shown in FIG. 1, GPS sensors 4 and 6 on the line 3, or hanging just below the line, on either side of the intended contact point with the rocket can be compared to the location of GPS sensors (not shown) on the side of the rocket on either side of the hook 15. Having two GPS sensors on the rocket provides backup, and if the north-south-east-west orientation of the GPS sensors on the rocket matches that of sensors 4 and 6 on the line 3, then the rocket is position properly in rotation about its vertical axis for the hook 15 to line up properly to engage the line 3. The center of the line 3 can be assumed to be approximately half way between the two sensors 4 and 6 and slightly below. If the calculated center of the line 3 isn't the correct amount below the height of the GPS sensors at the hook 15 on the rocket for landing or if either point is moving away from the correct relationship then the winches can be activated to correct the problem by raising or lowering the line 3 and/or the rocket can increase or decrease thrust to adjust. Similarly left and right adjustments can be made by the rocket or by steering of the ship or by one winch reeling in and one reeling out. By hanging on a very short tether below the line 3, GPS sensors 4 and 6 wouldn't make the line 3 too thick to engage hook 15 even if the contact occurred just above the sensor.

Contact between the line 3 and rocket 2 might be detected when a very low voltage current flows from the line 3 to the rocket 2. Other ways to detect contact of the line 3 to the rocket include the GPS sensors 4 and 6, accelerometers on the line 3 that detect the acceleration from the contact or even rate gyros on the GPS sensors hanging below the line which sense the rotation from the swinging motion cause by the contact.

An electro-optical (EO) or infra-red (IR) camera on the rocket near the hook 15 or on the line 3 near the GPS sensors 4 and 6 could be used to visually guide the rocket to the line as a backup to the differential GPS system. Radar of course could also be used. A system to detect that the line 3 has been safely captured by the hook 15 could use the same basic approach or use a switch to detect the latch 17 deflecting open and then closing shut again or a pressure switch 1 at the top of the throat to detect the force from the line 3 supporting the rocket.

Once it is detected that the line 3 is captured, the rocket engines can shut down. Preferably a data link is used that communicates between the rocket and the recovery system in order for a control system to know the spatial relationship between the line 3 and the hook 15 on the rocket preferably using differential GPS data from sensors 4 and 6 and commanding the winches 11 and 13 to raise or lower at the right times and to command the rocket to climb or descend, rotate or translate sideways.

For the landing, the recovery line 3 is suspended and built so that it provides little or no impact on the side of the rocket that could upset or damage the rocket. The preferred approach is for the line 3 to be slack so that it visibly drops down in the middle even before supporting the weight of the rocket; in other words, the line is not stretched or taut between its elevated suspension points and as described previously, the line can be raised or lowered. As used herein, if the tension stretching the line between the two suspension points is less than ten times the weight of the line then the line is not stretched or taut.

The next best way to reduce the impact of the line 3 on the rocket 2 is to have the recovery system structure more flexible than would be typical of a large structure designed to hold significant weight suspended between two towers; it is thereby designed to elastically deform without breaking to act as a shock absorber. Line 3 might also stretch more under load than would be typical for a line designed to suspend an object between two towers. Actuator 73 in FIG. 13, as described previously, could instead, or in addition, be a shock absorber.

The middle of the unloaded line 3 should be below the height of the line 3 at the towers by at least 5% of the span between the towers. 10% is better than 5%, 15% is better than 10%, and 20% is better than 15%. The geometry should also preferably allow the winches to adjust the height of the line 3 greater than the height of the rocket so a landing could be aborted by moving the line 3 above or below the rocket and letting the rocket pass by when the rocket is at its nominal height for landing. This nominal landing height should also preferably be one rocket's height of clearance or more above the sea or hard structure it might hit. The height of the rocket is preferably 7.6 meters (twenty-five feet) or higher. The distance between the structure supporting the landing line 3 is greater than four times the maximum width of the rocket, preferably more than five times the width, and even better seven times the width and even better ten times.

There is preferably no structure, with the exception of the landing line, that is located half way between the towers at the nominal height of the rocket used for landing or within a distance of that point equal to the maximum width of the rocket.

Figure 12:
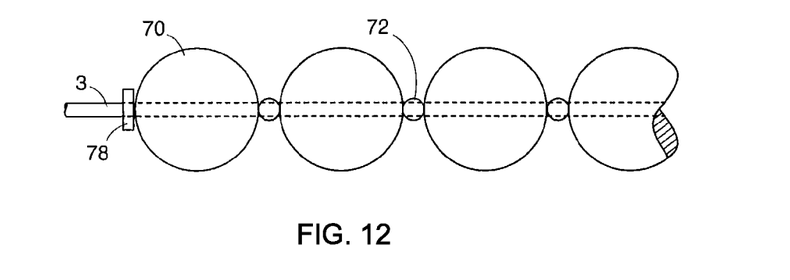
FIG. 12 shows spherical cushions on the rocket recovery line that roll to reduce the friction of the line rolling to the latching hook on the rocket.

The line also can be covered with a soft padded outer layer at the middle of the line 3 where it is designed to contact the side of the rocket so as not to dent or scrap the rocket. The preferred approach, as shown in FIG. 12, is to have the padding as individual rolling cushions such as spheres 70, or at least a shape that has a circular, or near circular, cross-section in a plane perpendicular to the line 3. Preferably it would resemble pearls strung on a necklace that are free to rotate about the line 3. The spheres 70 can thus roll up the side of the rocket to reduce the friction and potential for scraping the side of the rocket. This approach also helps to maintain most of the flexibility of the line 3 in bending relative to a design with the same thickness of padding everywhere on the line. Spacers 72 or stops 78 on the line 3 to keep the spheres from directly contacting each other could keep the line almost as flexible in bending as without any padding. These spheres 70 could be inflated with air or could be made of flexible foam or other suitable cushioning material. The throat 23 of the hook 15 on the rocket would preferably be wider than the diameter of the spheres 70. Alternatively the spheres 70 could be compressed as they are pushed into the throat 23 or would be pushed to the side by the hook 15 so that they slide along the line 3, or slide with the line 3, to end up on one side or the other of the hook 15. At least two stops 78 would be used, one at each end of the string of spheres, or at least rolling cushions, to keep the cushions 70 in place along the line 3. By reeling in one winch 11 and reeling out the other winch 13, the rolling cushions 70 can be moved left or right to always line up with the rocket as it approaches. As an alternative to rolling cushions 70, the line 3 could be made of a slick material and/or oiled to more easily slide up the side of the rocket.

Figure 5:
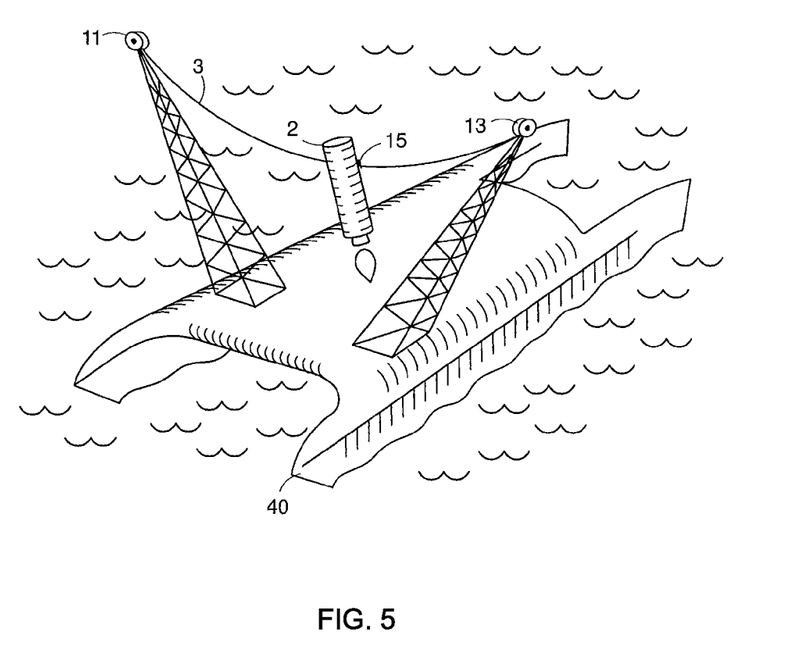
FIG. 5 shows a preferred catamaran rocket landing ship.

After capturing the rocket with catamaran 40 as shown in FIG. 5, the rocket 2 could be lowered by the winches 11 and 13 and another line attached by a sailor by use of a long pole to a hook near the bottom of the rocket to stabilize the rocket from blowing around in the wind. The rocket could then be raised again with winches 11 and 13 to keep the rocket above the salt spray for less corrosion as the ship 9 or 40 transports the rocket back to shore for refueling and another launch.

Figure 8:
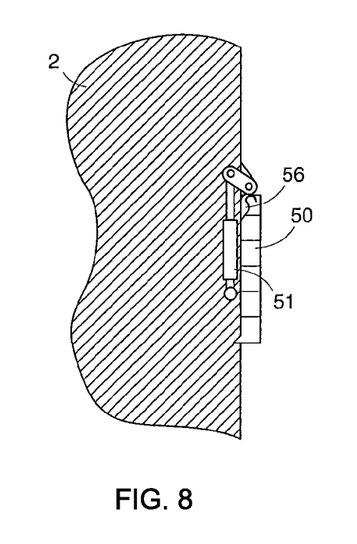
FIG. 8 shows box fins on the side of the rocket in their retracted position.
Figure 9:
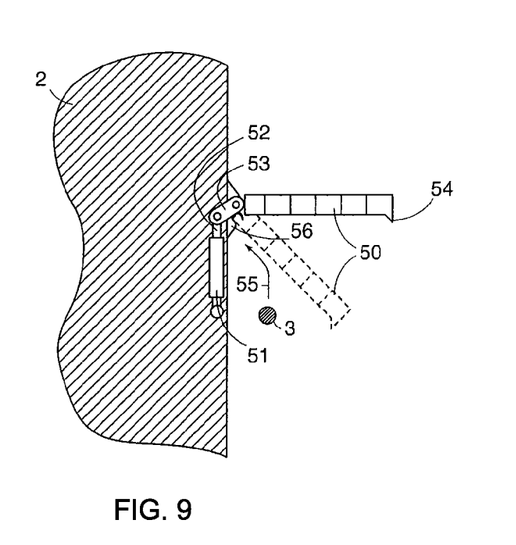
FIG. 9 shows box fins of FIG. 8 in their extended position to help stabilize the vehicle during re-entry into the atmosphere and in a position to capture the recovery line 3.

As an alternative to the hooks previously described, FIGS. 8 and 9 show how a rocket mounted structure could extend out and capture the line 3. In this case FIG. 8 shows box fins 50 folded down flat against the side of the rocket 2. For stability when re-entering the atmosphere the box fins 50 are extended to the position shown in FIG. 9 by actuator 51 retracting piston 52 which rotates bellcrank 53 and box fins 50. Using box fins for stabilizing rockets is already well known. During landing, when the recovery line 3 is below the box fins 50, actuator 51 then retracts the box fins to their stowed position trapping the line 3. Hook 54 reduces the chances that line 3 would escape capture. When the box fins 50 are stowed, hook 54 extends into the rocket 2 to make sure the line 3 can't travel down and escape. The box fins 50 could also be partially retracted to the position shown in dashed lines so that the line 3 would be deflected in to the side of the rocket 2 as the line 3 moved upward as shown by path 55. Alternatively the box fins 50 could be designed to only extend to the position shown in dashed lines and stabilize the rocket from that position. Optionally a latching hook 56, similar to hook 15, near the hinge point of the box fins 50 could capture the line 3 or the box fins 50 could subsequently be retracted against the side of the rocket as described before. Another option is for the box fins 50 to be forced up by line 3 so that line 3 slides out and is captured by hook 54 which could be equipped with a latch to prevent line release. Although box fins are used in this example, another device or a dedicated structure could operate in a similar manner.

Figure 10:
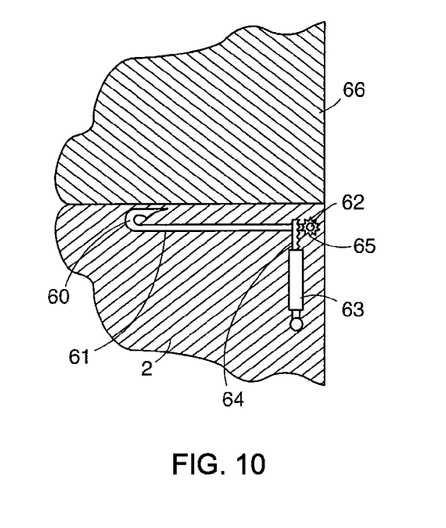
FIG. 10 shows another optional hook design with the hook in a retracted position.
Figure 11:
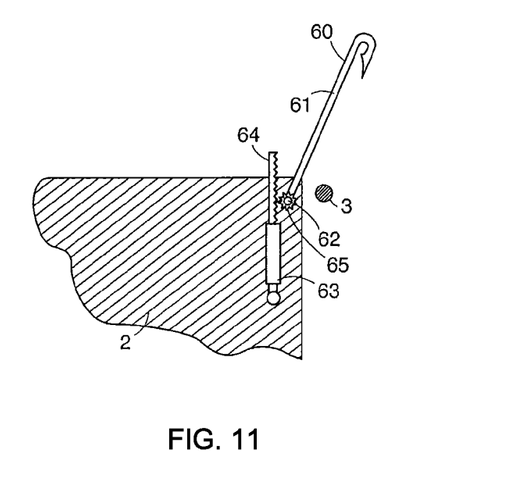
FIG. 11 shows the hook of FIG. 10 in an extended position.

FIGS. 10 and 11 show still another approach. A latching hook 60 is on the end of an arm 61 that is free to rotate about hinge 62 and is spring loaded by cylinder 63 through rack gears 64 and pinion gears 65 to extend. The hook 60 and arm 61 are held in the retracted position, inside the top of the rocket 2, however by interference with structure in the upper rocket structure 66 that separates after the lower rocket structure 2 has performed its boost function. After separation, the hook 60 and arm 61 rotate out to the position shown in FIG. 11. They of course could also be held in the retracted position by other devices as is well known in the art and commanded to extend prior to engaging line 3. Cylinder 63 also has a damper in it that increases the forces needed to rotate the arm back toward the stowed position but provides little or no damping for movement toward the extended position shown in FIG. 11. This decreases the possibility that the line 3 would hit the arm 61 and not engage the hook 60. Alternatively the box fins 50, prior to landing, could be extended approximately 145 degrees from their stowed position in FIG. 9 and hook 54 could be replaced with a latching hook like hook 15 so that the box fins could act in a similar manner to the approach shown in FIGS. 10 and 11.

Figure 3:
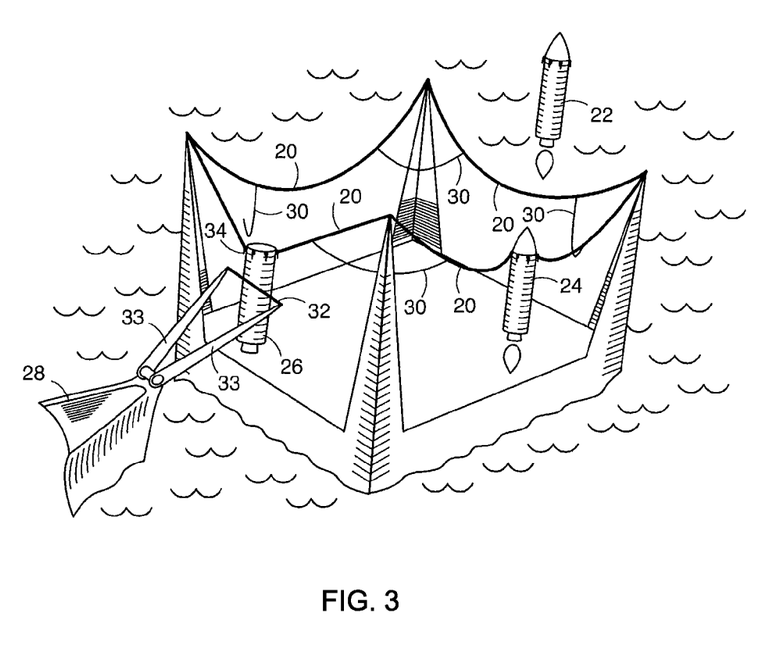
FIG. 3 shows a floating platform recovering three rockets and a way to transfer those rockets onto another ship.

FIG. 3 shows a floating platform with four recovery lines 20. Rocket 22 is shown approaching one of the recovery lines. Rocket 24 is shown already pushing up against its recovery line. Rocket 26 has previously landed and a ship 28 is shown that is about to lift the rocket off the recovery line 20 with a bow mounted line 32 stretched between two beams 33. Line 32 would engage a separate hook 34 located on the other top side of rocket 26 from hook 15. Hooks like 15 and 34 could be spaced all around the top rim of the rockets if you wanted the rocket to engage a recovery line from any direction or side. The rockets could also descend into the middle of the recovery lines 20 and then they could move in any direction to engage one of the recovery lines 20. A rocket moving outboard from the middle could also engage lines 30 for recovery. If the towers and lines shown in FIG. 3 surround the launch pad this structure could also serve as the lightning protection for the rocket prior to launch. The recovery lines might be raised to provide better lightning protection and then lowered to be slack for the recovery.

All of these towers such as shown in FIGS. 1, 3, and 5 could of course be placed on land or on a large land vehicle.

Figure 4:
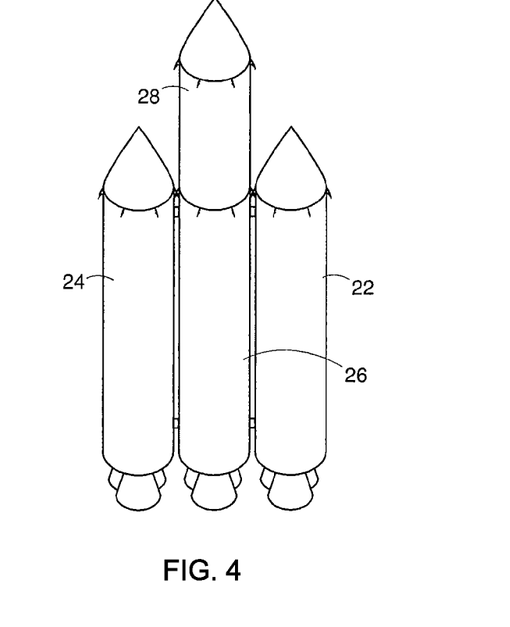
FIG. 4 shows the rocket assemblies of FIG. 3 prior to launch.

FIG. 4 shows how the three rockets 22, 24 and 26 might be assembled for launch with the payload and optionally an upper stage rocket 28. All of the rockets 22, 24, 26, and potentially even 28 if an upper stage, that are designed to be recovered using this line recovery system would have one or more rocket engines that can vary their thrust in flight to allow the rocket to fly safely in a generally vertical attitude up to the line 3. Preferably at least one rocket engine can vector its rocket thrust in different directions to provide most of the pitch and yaw control of the rocket. These rockets would also have thrusters to provide attitude control and limited forward thrust in order to move the fuel and oxidizer to the bottom of their respective tanks to make possible a relight of the rocket engines while in zero-g or near zero-g conditions. A typical mission would have the rockets place a payload in orbit in the conventional manner then the re-usable rocket or rockets would turn around using their attitude control thrusters and at least one of the rocket motors would be used to decelerate the rocket to reduce the distance the rocket travels downrange, or even to return to the launch site, and to reduce the airspeed during re-entry to avoid overheating the rocket, and to slow the rocket to a hover for engagement with the recovery line 3. If the rocket 2 finds that it isn't headed directly for the proper landing site after entering the atmosphere, the active rocket motor or motors can be steered to create a side force in the direction of the intended landing site which would change the angle of attack of the rocket. This rocket side force, the side force resulting from the angle of attack generated lift on any stabilizing fins nears the top of the rocket 2 such as box fins 50 and aerodynamic forces on the rocket would move the rocket in the desired direction. The rocket should be more than 7.6 meters (twenty-five feet) high and capable of putting a payload into orbit with, or without, assistance from other rocket stages. The rocket is also designed to land in a more vertical than horizontal attitude and preferably no fixed structure to engage the recovery system always sticks out from the side of the rocket body more than 8% of the height of the rocket. The maximum width of the rocket should also be less than 80% of the height of the rocket.

This landing approach can allow launch and recovery on the same pad since the rocket does not touch down on the ground where it could damage equipment such as the connection used to add fuel and oxidizer to the first stage prior to launch. After landing the winches 11 and 13 could be operated to move the rocket directly over, and then down onto the spot for the next refueling and launch. One or more lines from winches on the ground could be connected to the bottom of the rocket to pull the rocket hard points to the exactly location for supporting the fueled rocket prior to launch.

Although the rocket could take off while still suspended on the line 3 by retracting latch 17, it is preferred to make a conventional rocket takeoff with the rocket supported from a base prior to launch. However the most inefficient period for a rocket is during liftoff and initial acceleration. During launch, the line 3 might still be engaged to hook 15 and winches 11 and 13 could reel in to give the rocket an initial assist in accelerating upward. The line 3 also might connect to a hook on the side of the rocket down closer, or at, the base of the rocket to give a more efficient and longer boost. Another line could connect to a hook on the other side of the rocket to provide an upward boost from both sides.

All of the features described herein are designed to be used in any combination thereof.

The invention claimed is:

1. A re-usable rocket equipped with at least one capture device above a portion of one or more main propulsion rocket engines when said rocket is in a vertical attitude to capture an elevated support element and thus allow landing on said elevated support element, wherein said one or more capture devices are not used to support the entire weight of the rocket prior to launch.

2. The re-usable rocket of claim 1 in which the at least one capture device is located above the rocket center of gravity with the rocket in a vertical attitude.

3. The re-usable rocket of claim 1 in which the at least one capture device is located so as to capture a support element after said support element has contacted the side of the rocket and traveled up to said capture device.

4. The re-usable rocket of claim 3 in which the support element is a line, cable or chain.

5. The re-usable rocket of claim 1 in which the at least one capture device is a hook.

6. The re-usable rocket of claim 5 in which the hook has a support element retaining mechanism.

7. The reusable rocket of claim 6 wherein said support element retaining mechanism is a latch.

8. The reusable rocket of claim 1 wherein said rocket is free of wings and aerodynamic control surfaces to allow controlled flight in horizontal airplane mode.

9. The reusable rocket of claim 1 wherein said rocket is free of landing structure that would stabilize the rocket in roll during a skid or rolling runway landing, said landing structure being laterally spaced landing gear.

10. The re-usable rocket of claim 1 in which said at least one capture device is located fully above the altitude of one or more main propulsion rocket engines when said rocket is in a vertical attitude.

11. The re-usable rocket of claim 1 wherein the rocket is supported closer to the bottom of the rocket than the top and supported in a vertical attitude by a base underneath the rocket prior to launch.

12. The re-usable rocket of claim 1 that is free of runway wheeled or runway skid landing gear structure.

13. The re-usable rocket of claim 1 that is free of landing gear structure required to stabilize the rocket on a landing pad, said landing gear structure including portions of a landing gear below one or more main propulsion rocket engines.

14. The re-usable rocket of claim 1 wherein said rocket is capable of putting a payload into orbit.

15. A re-usable rocket and a recovery system for said rocket, said recovery system having an elevated support element, and a capture device operatively attached to said rocket above the bottom of a main propulsion rocket engine with the rocket in its landing attitude and said capture device positioned so as to capture said elevated support element of said rocket recovery system, said capture device not being used to support the entire weight of the rocket prior to launch.

16. The re-usable rocket and recovery system of claim 15 wherein the support element is not taut or stretched.

17. The re-usable rocket and recovery system of claim 15 wherein the recovery system has a height control system to vary the height of the support element to assist in maneuvering the support element into engagement with the capture device.

18. The re-usable rocket and recovery system of claim 17 wherein the height control system raises the support element to engage the capture device.

19. The re-usable rocket and recovery system of claim 15 wherein GPS sensors located on both said rocket and said recovery system are part of a guidance system capable of maneuvering said rocket into engagement with said recovery system and assisting in bringing the capture device and support element into engagement with each other.

20. The re-usable rocket and recovery system of claim 15 wherein the support element is a line, cable or chain.

21. The re-usable rocket and recovery system of claim 20 wherein the support element is padded.

22. The re-usable rocket and recovery system of claim 20 wherein the support element is lubricated or has rolling elements on said support element to reduce the friction of the support element sliding to the capturing device.

23. The re-usable rocket and recovery system of claim 15 wherein the capture device is a hook.

24. The re-usable rocket and recovery system of claim 23 wherein the hook has a support element retaining mechanism.

25. The re-usable rocket and recovery system of claim 15 wherein the recovery system is on a water vessel.

26. The re-usable rocket and recovery system of claim 15 in which the support element is suspended between two towers.

* * * * *